(12) United States Patent  (10) Patent No.: US 7,300,092 B2
Dunn  (45) Date of Patent: Nov. 27, 2007

(54) PEDALS AND FLOOR MAT CONFIGURATION FOR AN INDUSTRIAL VEHICLE

(75) Inventor: Colin F. Dunn, Dalry (GB)

(73) Assignee: NMHG Oregon Inc., Portland, OR (US)

( * ) Notice: Subject to any disclaimer, the term of this patent is extended or adjusted under 35 U.S.C. 154(b) by 0 days.

(21) Appl. No.: 11/400,052

(22) Filed: Apr. 7, 2006

(65) Prior Publication Data

US 2006/0226675 A1 Oct. 12, 2006

Related U.S. Application Data

(60) Provisional application No. 60/669,744, filed on Apr. 8, 2005.

(51) Int. Cl.
*B62D 25/14* (2006.01)

(52) U.S. Cl. ...................................................... 296/70

(58) Field of Classification Search .................. 296/70, 296/37.23, 37.16; 180/315, 90.6, 167
See application file for complete search history.

(56) References Cited

U.S. PATENT DOCUMENTS

| | | | | |
|---|---|---|---|---|
| 3,394,770 A | * | 7/1968 | Goodacre | 296/63 |
| 3,469,858 A | * | 9/1969 | Goodacre | 280/93.506 |
| 4,587,865 A | * | 5/1986 | Winner | 74/562.5 |
| 4,958,535 A | * | 9/1990 | Swartzendruber | 74/481 |
| 5,579,859 A | * | 12/1996 | Quellhorst et al. | 180/89.13 |
| 6,009,357 A | * | 12/1999 | Wellman et al. | 180/168 |
| 6,182,778 B1 | * | 2/2001 | Henshaw et al. | 296/190.1 |
| 6,793,247 B2 | * | 9/2004 | Swetish | 280/775 |
| D539,502 S | * | 3/2007 | Quinlan et al. | D34/35 |
| D539,503 S | * | 3/2007 | Quinlan et al. | D34/35 |
| 2002/0194948 A1 | * | 12/2002 | Sundaresan et al. | 74/560 |
| 2003/0080706 A1 | * | 5/2003 | Waite | 318/551 |
| 2006/0226675 A1 | * | 10/2006 | Dunn | 296/75 |

* cited by examiner

*Primary Examiner*—Kiran B. Patel
(74) *Attorney, Agent, or Firm*—Stolowitz Ford Cowger LLP

(57) ABSTRACT

A presence detection system may include a pedal assembly that is located underneath a vehicle floor. The pedal assembly in one embodiment is recessed within the underside of a floor mat to eliminate trip hazards on the vehicle floor. Other embodiments may include a textured upper mat surface that provides traction, indicates the location of the recessed presence pedal and provide run-off for liquid spills.

9 Claims, 5 Drawing Sheets

FIG. 4
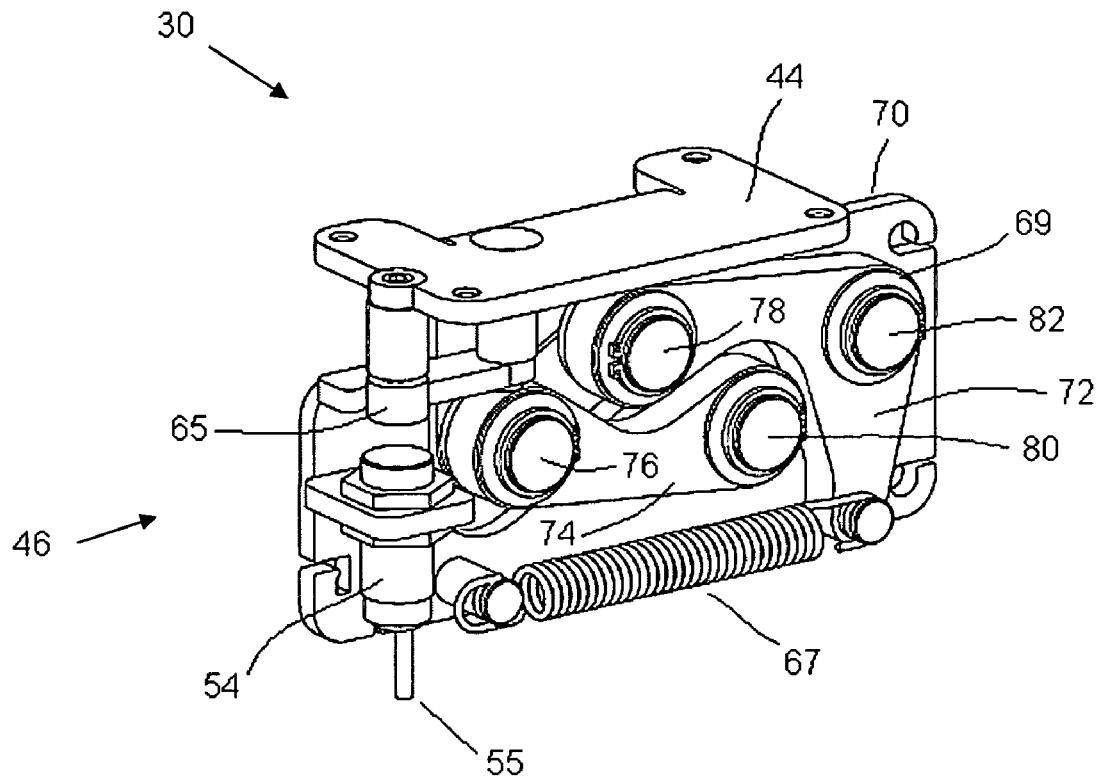
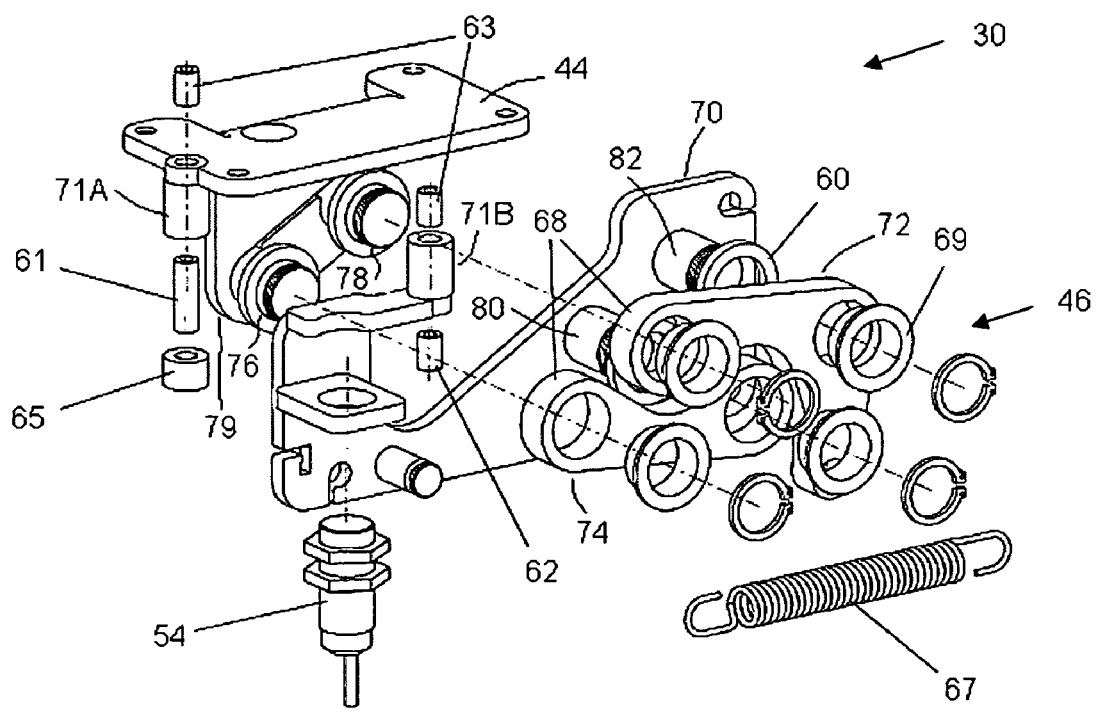
FIG. 5

PEDALS AND FLOOR MAT CONFIGURATION FOR AN INDUSTRIAL VEHICLE

This application claims priority from U.S. Provisional Application 60/669,744, filed on Apr. 8, 2005, and herein incorporated by reference.

BACKGROUND

The invention relates to a presence detection system used primarily in a vehicles such as an industrial pallet truck.

Industrial trucks, such as lift trucks, may include a cabin where an operator rides while driving the vehicle and may possibly include a fork lift for carrying loads. The floor in some lift trucks may be fitted with a presence pedal. The presence pedal is alternatively referred to as a "dead man switch". The presence pedal or dead man switch disables certain truck operations when the operator is not in a normal operating position in the cabin. For example, the vehicle may not start or move until the operator stands on the presence pedal. This can be used as a safety feature that shuts off the vehicle if the operator happens to fall out of the lift truck cabin.

Current presence pedals currently extend up out of the floor of the pallet truck cabin. This creates a trip point for the operator and also make it more difficult for the operator to move around in the cabin. Current presence pedals extend up through an opening in the cabin floor. Water, dirt, and other debris can fall through this opening and may disrupt or damage equipment located underneath the floor of the cabin.

The present invention addresses this and other problems associated with the prior art.

SUMMARY OF THE INVENTION

A presence detection system may include a pedal assembly that is located underneath a vehicle floor. The pedal assembly in one embodiment is recessed within the underside of a floor mat to eliminate trip hazards on the vehicle floor. Other embodiments may include a textured upper mat surface that provides traction, indicates the location of the recessed presence pedal, and provide run-off for liquid spills.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 4 shows a perspective view of a pedal assembly used in the presence detection system.

FIG. 5 shows an exploded view of the pedal assembly shown in FIG. 4.

DETAILED DESCRIPTION

Figure 1A:
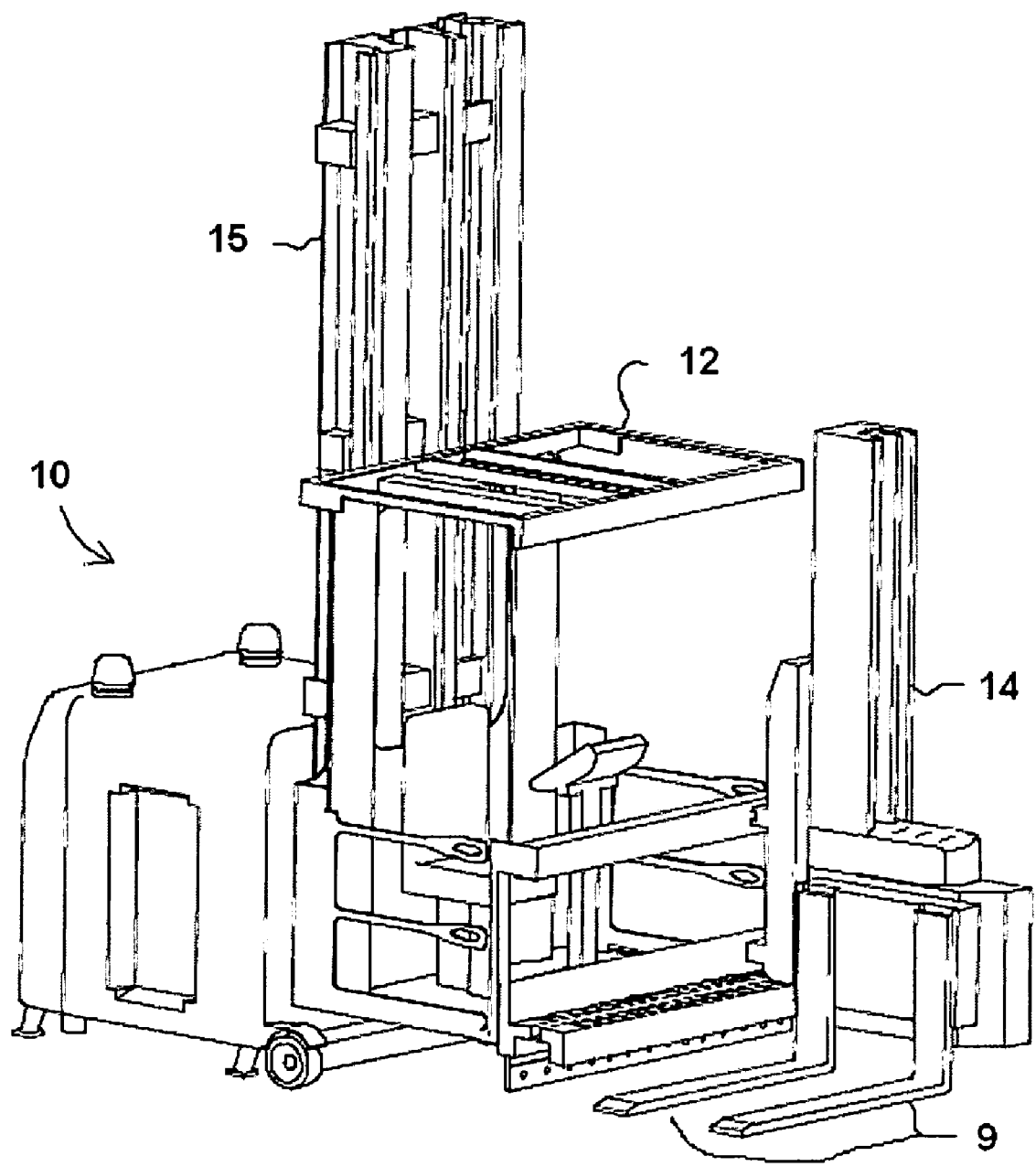
FIG. 1A shows a perspective view of a lift truck.

FIG. 1A shows a lift truck 10. The lift truck 10 includes a cabin 12, main mast 15, auxiliary mast 14, and forks 9. The auxiliary mast 14 is mounted on the cabin 12. The cabin 12 and auxiliary mast 14 may be lifted and lowered on the main mast 15. The forks 9 may be lifted and lowered on the auxiliary mast 14.

Figure 1B:
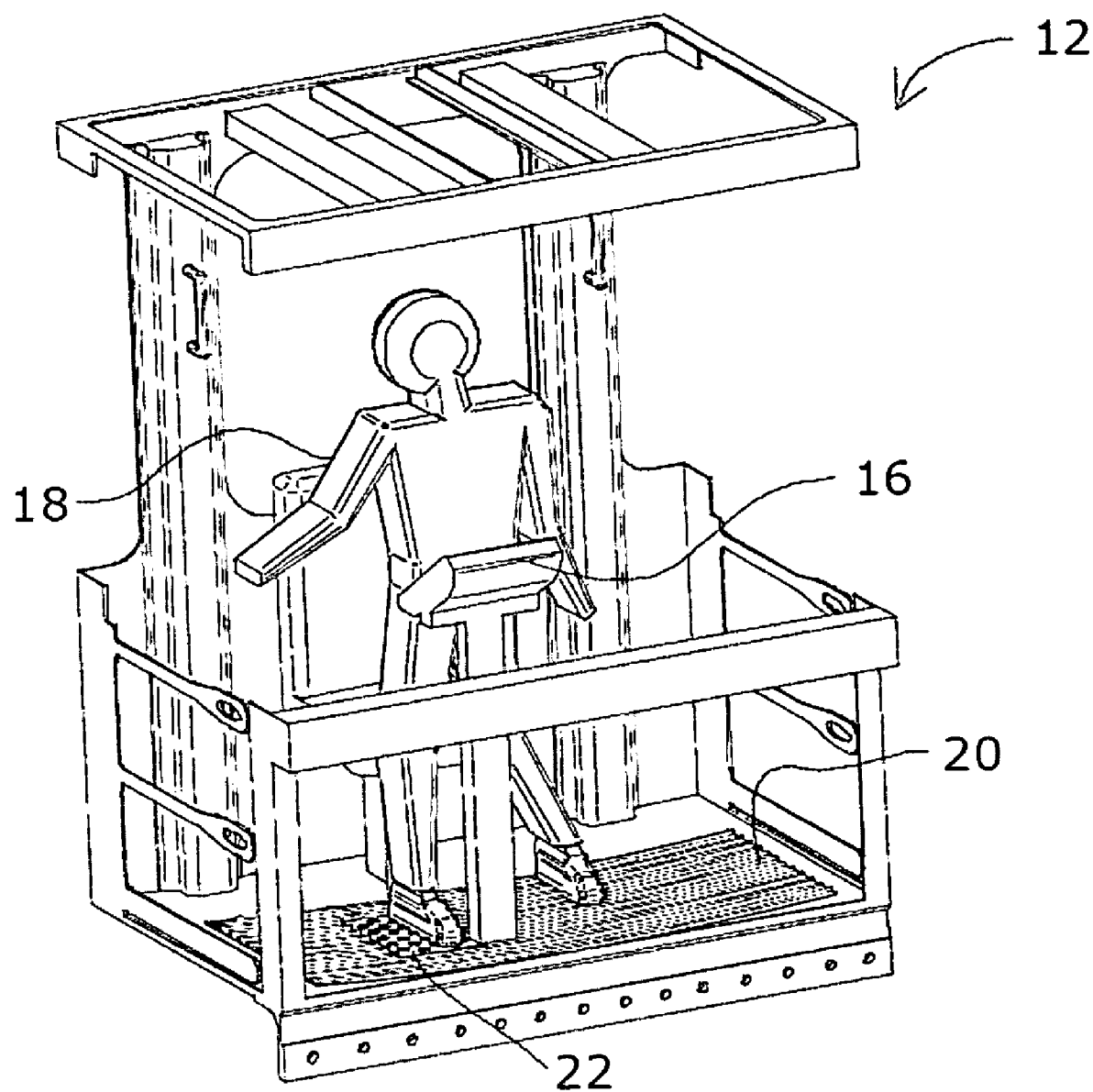
FIG. 1B shows a perspective view of an operator cabin of the lift truck that shows an operator standing on a presence detection system.

FIG. 1B shows an operator 18 standing in a cabin 12 of the lift truck 10. The cabin 12 includes a floor 20 that contains a presence detection system 22. The operator 18 stands on a particular area of the presence detection system 22 in order to operate the lift truck 10. For example, the lift truck 10 may not start until the operator 18 stands on a particular location of the presence detection system 22. Similarly, the lift truck 10 may stop if the operator steps out of the cabin 12 or steps off of the presence detection system 22. In another example, the main mast 15 or auxiliary mast 14 (FIG. 1A) may be disabled when the operator 18 is not standing on the presence detection system 22. In yet another example, an operator control 16 may be disabled when the operator 18 is not standing on the presence detection system 22. Of course these are only examples of the different vehicle operations that may be disabled when the presence detection system 22 is not activated.

As will be described in more detail below, the presence detection system 22 includes a pedal 34 recessed within the underside of a floor mat 36 (FIG. 3) to eliminate trip hazards on the cabin floor 20. An upper mat surface is textured to provide grip, indicate the location of the recessed presence pedal, and provide run-off for liquid spills. While shown installed in a lift truck 10, it should also be understood that the presence detection system 22 can be used in any vehicle that needs to either enable or disable vehicle operations based on the detected presence of a vehicle operator 18.

Figure 2:
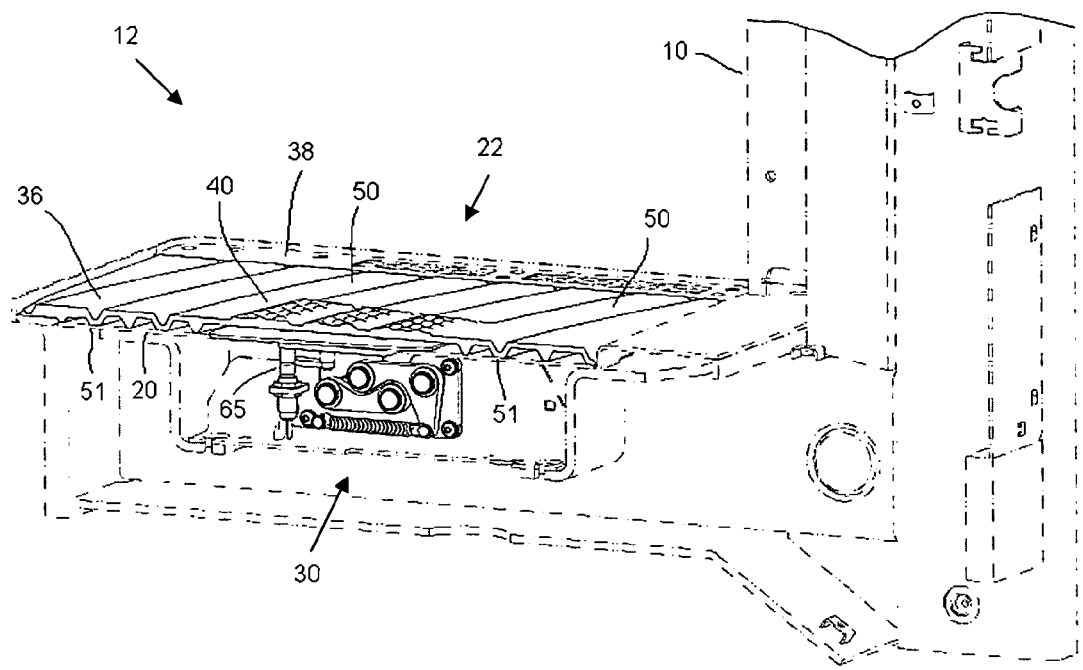
FIG. 2 shows the presence detection system in more detail.
Figure 3:
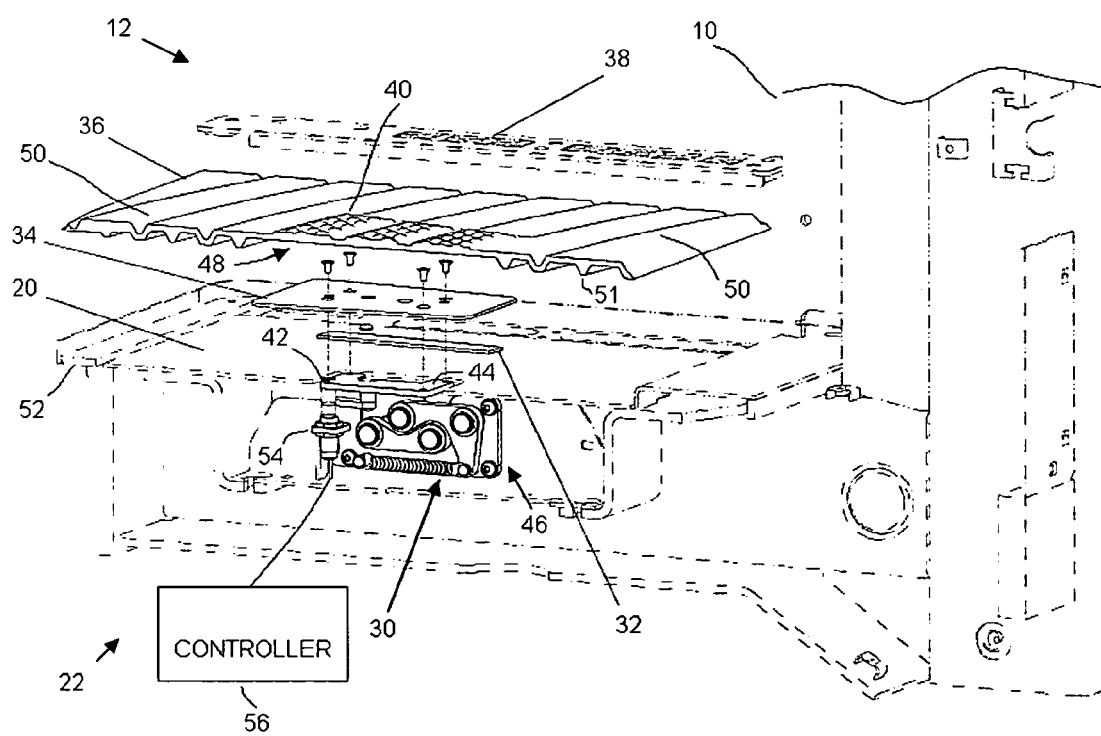
FIG. 3 shows an exploded view of the presence detection system.

FIG. 2 shows the presence detection system 22 in an isolated view with the cabin 12 shown in a cutaway shadow view with dashed lines. FIG. 3 shows an exploded view of the same presence detection system 22. Referring to FIGS. 2 and 3, a pedal assembly 30 is fixed underneath the floor 20 of cabin 12. A lower pedal platform 44 extends up through a hole 42 in floor 20 and is attached to an upper pedal plate 34. A hinging assembly 46 retractably suspends the lower pedal platform 44 and upper pedal plate 34 above the floor 20. The floor 20 is rigidly attached to the cabin 12 and supports the operator 18, pedal assembly 30, and a floor mat 36. The floor 20 may act as a down-stop for the upper pedal plate 34. Dampening and noise reduction are provided by sponge strips 32 bonded to the underside of the upper pedal plate 34. The pedal assembly 30 may alternatively be referred to as a "dead man switch".

One embodiment of the floor mat 36 is made from a polyurethane material and sits on the cabin floor 20. The floor mat 36 is suspended above the cabin floor 20 by ribs 51 that extend downward from a bottom side. One area of the bottom side of floor mat 36 does not include ribs 51 and thereby forms a cavity 48 that receives or contains the upper pedal plate 34. If required, the ribs 51 also allow passage of cabling between the floor mat 36 and floor 20.

Channels 50 extend across a top surface of floor mat 36 and serve to direct any water or other fluids falling on the top surface outward towards the outside edges of the floor mat 36 away from a central location where the pedal assembly 30 is located. The floor mat 30 seats within a recess in floor 20 formed by a lip 52, and is held down on the sides by step plates 38.

The floor mat 36 further includes a sensing area 40 that in one embodiment includes a textured or traction surface that has a different surface shape or design than the remainder of the top surface. The design of the sensing area 40 provides an indication of where the operator 18 needs to stand to depress upper pedal plate 34. The surface design of sensing area 40 can also provide additional gripping for the foot of the operator 18 by providing for example, a pebbled, hatched, serrated, or other non-smooth floor mat surface.

When an operator steps on sensing area 40, the floor mat 36 moves downward pressing against upper pedal plate 34. The pedal assembly 30 then retracts allowing both the upper pedal plate 34 and lower pedal platform 44 to move downward until a sensing unit 54 detects a proximity element 65. This sends a signal to an electrical controller 56 that then enables vehicle operations that require the operator 18 to be present in cabin 12 (FIG. 1B).

If the operator 18 steps off of sensing area 40, the pedal assembly 30 retracts causing both lower pedal platform 44 and upper pedal plate 34 to move upwards into an elevated position inside cavity 48. The sensing unit 54 loses actuation with the proximity element 65 removing the actuation signal to controller 56. The controller 56 accordingly disables the vehicle operations that required the operator 18 to be located on the sensing area 40.

It should be understood that actuators other than a pedal assembly 30 could also be used. For example, a plunger type button switch could be used that extends from the cabin floor 20. The cavity 48 in the floor mat 36 would then be adapted to the shape of the plunger switch. Further, there is also no requirement that a floor mat be used to cover the pedal assembly 30. Alternatively, a rubber epoxy or alternative water resistant cover may extend over the hole 42 in floor 20. The rubber cover may seamlessly extend from the sides of the hole 42 over the top of a pedal plate 34 that is sized to fit inside of hole 42. The pedal plate 34, when depressed by the operator 18, may move into hole 42 and activate sensor 54. Alternatively, the upper pedal plate 34 may never extend up from hole 42. In this embodiment, a domed rubber pad may extend from hole 42 and depress lower pedal platform 44 down underneath floor 20.

FIGS. 4 and 5 show the pedal assembly 30 in more detail. Two pivot members 72 and 74 are pivotally attached at one end to pivots 82 and 80, respectively, that extend from bracket 70. Opposite ends of pivot members 72 and 74 are also pivotally connected to pivots 78 and 76 on a flange 79 that extends from the bottom of lower pedal platform 44.

FIG. 4 shows pedal assembly 30 in a raised condition where a spring 67 pulls a bottom end of pivot member 72 forward, in turn rotating the opposite end of pivot member 72 upwards, holding lower pedal platform 44 in the raised position. The pivot member 74 rotates upward in unison with pivot member 72 to keep the lower pedal platform 44 and attached upper pedal plate 34 in a substantially horizontal alignment when transitioning between the raised and lowered positions.

In the raised position, a proximity element 65 is spaced apart from an inductive sensor 54. The proximity element 65, for example, may be a magnet. The sensor 54 may not generate a signal when this spacing exists between sensor 54 and proximity element 65. This non-signal indication is detected by controller 56 in FIG. 3 via conductors 55. The non-signal causes the controller 56 to disable any of the vehicle operations that require the operator to be standing or stepping on pedal assembly 30.

When the upper pedal plate 34 and lower pedal platform 44 are depressed, the two pivot members 72 and 74 rotate downwards causing the proximity element 65 to come within a sensing range of the sensor 54. Accordingly, the sensor 54 sends a presence signal over conductors 55 to the controller 56 that indicates operator presence. Software and/or hardware in the controller 56 then enable whatever vehicle operations require the operator to step down on pedal assembly 30.

Once released, the spring 67 pulls pivot member 72 forward, raising the lower pedal platform 44 and upper pedal plate 34 back up into the cavity 48 (FIG. 3) in floor mat 36. This simultaneously moves the proximity element 65 up away from sensor 54 disabling the presence signal and associated vehicle operations.

As mentioned above, the hinge mechanism that includes pivot members 72 and 74 and pivots 80, 82, 76, and 78 constricts the surface of lower pedal platform 44 to remain horizontal and substantially parallel with floor 20 while moving between the raised and lowered positions. This allows operation of the presence detection system 22 when the upper pedal plate 34 is loaded at any surface location while still remaining underneath a relatively low profile cavity 48 in floor mat 36. The geometry of the pedal assembly 30 is intended to provide a calculated resistance against the foot of the operator allowing the operator 18 to activate the presence detection system 22 while standing or in a seated position.

Non-metallic flanged bushings 69 and nylon washers 60 reduce friction losses in the hinging mechanism 46 and prevent seizure when operated in cold storage applications. The distance between the sensor 54 and proximity element 65 while in the lowered position may be varied according to the sensitivity of the sensor 54 by turning a grub screw 61. The distance that the lower pedal platform 44 is allowed to move downward in the depressed condition is adjusted by another grub screw 62. Both grub screws 61 and 62 are adjustable from the cabin 12 when the pedal assembly 30 is fitted in place.

Both grub screws 61 and 62 can be locked in place by turning screws 63 into opposite ends of receiving sleeves 71A and 71B that have female threaded receptors on both a top and bottom end. Thus, the pedal assembly 30 is fully height and sensitivity-adjustable, and is suitable for use in both conventional and cold storage applications.

The pedal assembly 30 may be used in either a single or dual pedal configuration. The single pedal configuration is used, for example, when operator ingress and egress may be restricted by a forward barrier. The dual pedal configuration may be used, for example, when the vehicle is fitted with the auxiliary mast 14 (FIG. 1A) and a trilateral attachment. The dual pedal configuration may require two pedal assemblies 30 to be depressed at the same time in order for the truck to be fully operational. When a single pedal configuration is used, the pedal assembly 30 might be located under a right hand pedal plate, as the operator 18 faces the controls.

Figure 6:
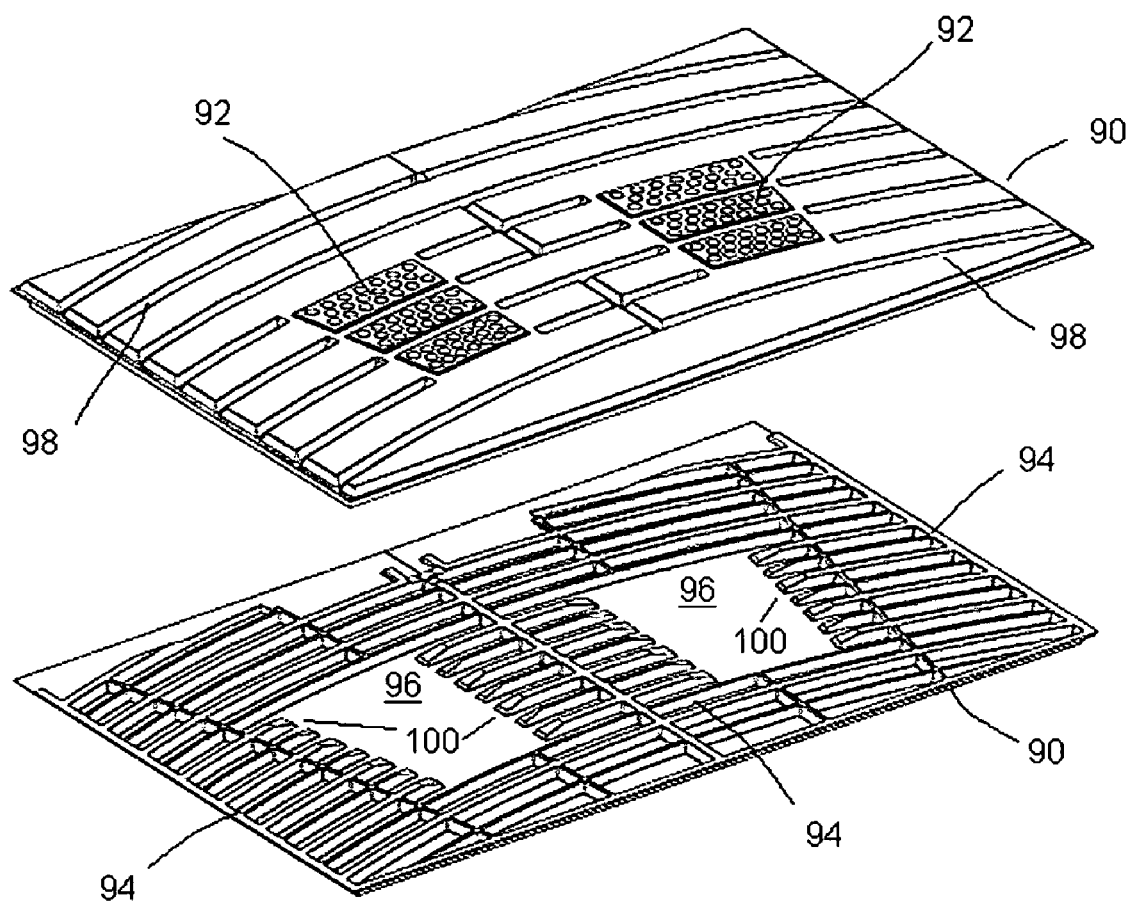
FIG. 6 shows topside and underside views of a floor mat used in a presence detection system that includes two pedal assemblies.

FIG. 6 shows one embodiment of a floor mat that may be used with the dual pedal configuration. The dual pedal configuration may arrange the position of the two pedal assemblies so that both pedals cannot be activated by one foot. In addition, the pedal assemblies may be arranged in such a manner that the foot of the operator 18 can not protrude beyond the leading edge of the cabin structure during operation and still press down both pedal assemblies 30.

In this embodiment, two separate pedal assemblies 30 are located directly underneath presence areas 92 in the floor mat 90. The top side of floor mat 90 includes channels 98 that both provide traction for the operator and also serve to direct water and any other fluids out away from the central sensing areas 92. The bottom side of floor mat 90 includes ribs 94 that suspend the top side up above the cabin floor 20 (FIG. 2) and further define the cavities 96 that are sized to receive two associated upper pedal plates 34 (FIG. 3) while in the raised position.

The ribs 94 may be of differing heights and lengths. In one embodiment, the ribs 94 in the middle of floor mat 90 may be higher than the ribs on the sides of floor mat 90. This creates a slightly domed shape on the top surface that further promotes the redirection of water toward the sides of floor mat 90. Further, the ends 100 of the ribs 94 next to the cavities 96 may have sloped sides that provide a graduated transgression to the non-ribbed cavities 96. This may provide more resilience and improve elasticity in the sensing areas 92.

The operator 18 (FIG. 1B) steps on the two presence areas 92 prior to starting some vehicle operation. The two presence areas 92 in mat 90 deflect downward under the weight of the operator 18 and accordingly depress the two pedal assemblies 30 located directly underneath. The two associated sensors 54 in the pedal assemblies 30 detect the associated proximity elements 65 (FIG. 4) and generate two associated presence signals. The controller 56 (FIG. 3), upon detecting the two presence signals, enables certain vehicle operations.

Again the floor mat 90 sits flush in the recess of the cabin floor 20 (FIG. 3). The pedal assemblies 30 sit completely underneath the presence areas 92 in floor mat 90, thus removing any pedal that would protrude upwardly through the cabin floor that could trip or otherwise obstruct the movement of the operator 18 while operating the vehicle 10.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A presence detection system, comprising:
   a detection device located on the floor of a vehicle that detects the presence of an operator in the vehicle when the operator depresses an actuator, and upon detection of the operator enabling vehicle operations that are disabled when the presence of the operator is not detected in the vehicle by the detection device, the detection device maintaining a position below or flush with a top surface of the floor while moving between a raised and lowered position,
   wherein the actuator comprises a pedal that maintains a substantially horizontal alignment parallel with the vehicle floor while moving between the raised and lowered positions.

2. The presence detection system according to claim 1 including a floor mat that extends over the actuator and includes at least one cavity in a bottom side for allowing the actuator to move between the raised position and the lowered position.

3. The presence detection system according to claim 1 including a sensor and proximity element, the sensor detecting the proximity element when the pedal is depressed and generating an enable signal for enabling the vehicle operations.

4. The presence detection system according to claim 3 wherein the proximity element and/or sensor are adjustable to vary a distance between the proximity element and the sensor when the pedal is depressed.

5. The presence detection system according to claim 1 including an adjustable stop that varies how far the pedal can be moved downward when in a fully lowered position.

6. The presence detection system according to claim 2 including ribs that extend downward from a bottom side of the floor mat suspending the floor mat above the vehicle floor and further including non-ribbed areas on the bottom side of the floor mat that form the cavity that contains the actuator.

7. The presence detection system according to claim 6 wherein a top side of the floor mat includes a presence area that identifies the location of the cavity on the bottom side of the floor mat and that when depressed by the operator, moves the actuator into the lowered position.

8. The presence detection system according to claim 7 wherein the floor mat includes two operator presence areas, each located in positions where feet of the operator would normally be located when operating the vehicle.

9. The presence detection system according to claim 2 wherein a top side of the floor mat has a domed shape and channels that direct liquid out towards a perimeter of the floor mat.

* * * * *